United States Patent
Baker, III et al.

(10) Patent No.: US 6,403,885 B1
(45) Date of Patent: Jun. 11, 2002

(54) INTEGRAL CABLE RETENTION DEVICE

(75) Inventors: Frank Phillip Baker, III, Chatham; Theodore Alan Conorich, Lake Hiawatha; Wayne Scott Filus, Lebanon, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/453,733

(22) Filed: Dec. 2, 1999

(51) Int. Cl.$^7$ ................................................. H02G 3/00
(52) U.S. Cl. .................. 174/68.3; 174/72 A; 174/72 R; 174/135; 361/826; 248/49; 138/111
(58) Field of Search ............................... 174/68.3, 12 A, 174/95, 97, 100, 68.1, 68.2, 72 R, 135, 99 R, 48, 50; 248/49; 361/826; 138/111, 112

(56) References Cited

U.S. PATENT DOCUMENTS

| | | | | |
|---|---|---|---|---|
| 5,023,404 A | * | 6/1991 | Hudson et al. | ............... 174/97 |
| 6,102,214 A | * | 8/2000 | Mendoza | ..................... 211/26 |
| 6,118,075 A | * | 9/2000 | Baker et al. | |

OTHER PUBLICATIONS

AT&T Practice Instruction Sheet, AT&T 631–400–110–12, Issue 1, Dec. 1993, 110P–Type Terminal Blocks Installation, pp. 1–4.

* cited by examiner

Primary Examiner—Dean A. Reichard
Assistant Examiner—W. David Walkenhorst

(57) ABSTRACT

A retention device for the installation of cabling includes a bottom surface for connecting the retention device to a support structure, and a top surface which is integrally connected to the bottom surface at a distance therefrom by an aft surface. The top surface includes at least two cable gripping members which define a passage for selectively housing the cable clusters. The gripping member is defined by a distal edge, a proximal edge and a structural area connecting them. The passage is defined by the distal edge and proximal edge of the adjacent gripping members and an aft edge of the aft surface. The aft edge engages the top surface in an off-set manner sufficiently large to generate clearance for, and reduce bending tension of, cable clusters which engage the retention device during installation. The gripping member further includes a forward end extension, integrally connected to the structural area of the gripping members. The forward extension includes a distal projection extending distally of the passage and a proximal projection extending proximally of the passage. The gripping member forward end extension also includes aft projections integral with the distal and proximal projections, and extending toward the bottom surface. The combination of the proximal, distal and aft projections extends into the open end of the passage enough to create a structure that inhibits the cable clusters from sliding or otherwise selectively exiting the gripping member.

17 Claims, 6 Drawing Sheets

INTEGRAL CABLE RETENTION DEVICE

FIELD OF THE INVENTION

This invention relates generally to the exchange of telecommunication information and, more particularly, to a system for routing telecommunication cables designed to ease the process of organizing the cables during installation.

BACKGROUND OF THE INVENTION

Generally, telecommunication cables are used as the medium to distribute telecommunication information. At any local distribution juncture, potentially dozens of telecommunication cables are required to perform the transfer of telecommunication information.

Prior to installing the cables into the various telecommunication components, it is essential that the cable clusters remain organized. The cable clusters are specifically organized to perform required communication functions as the particular pairs represent, for example, different end users. In a particular cabling application, cables are routed to designated ports in connector fields, known in the art, such as the "110" connector system, generally through a Patch Panel System Backboard, also known in the art. An installation sheet for the "110" cables, entitled "AT&T Practice Instruction Sheet," AT&T 631-400-110-12, Issue 1, December 1993, is incorporated by reference herein. The cables are then separated into three to seven cable clusters. The sheaths of the "110" cables are typically stripped and the cables are wired through telecommunication components to augment the process of connecting the cables in the telecommunication circuit. The component hardware for the "110" connector system usually attaches to ports on the backboard, wherein the components include wire blocks, terminal blocks, guide troughs, jack panels and other related telecommunication components known in the art.

Figure 1:
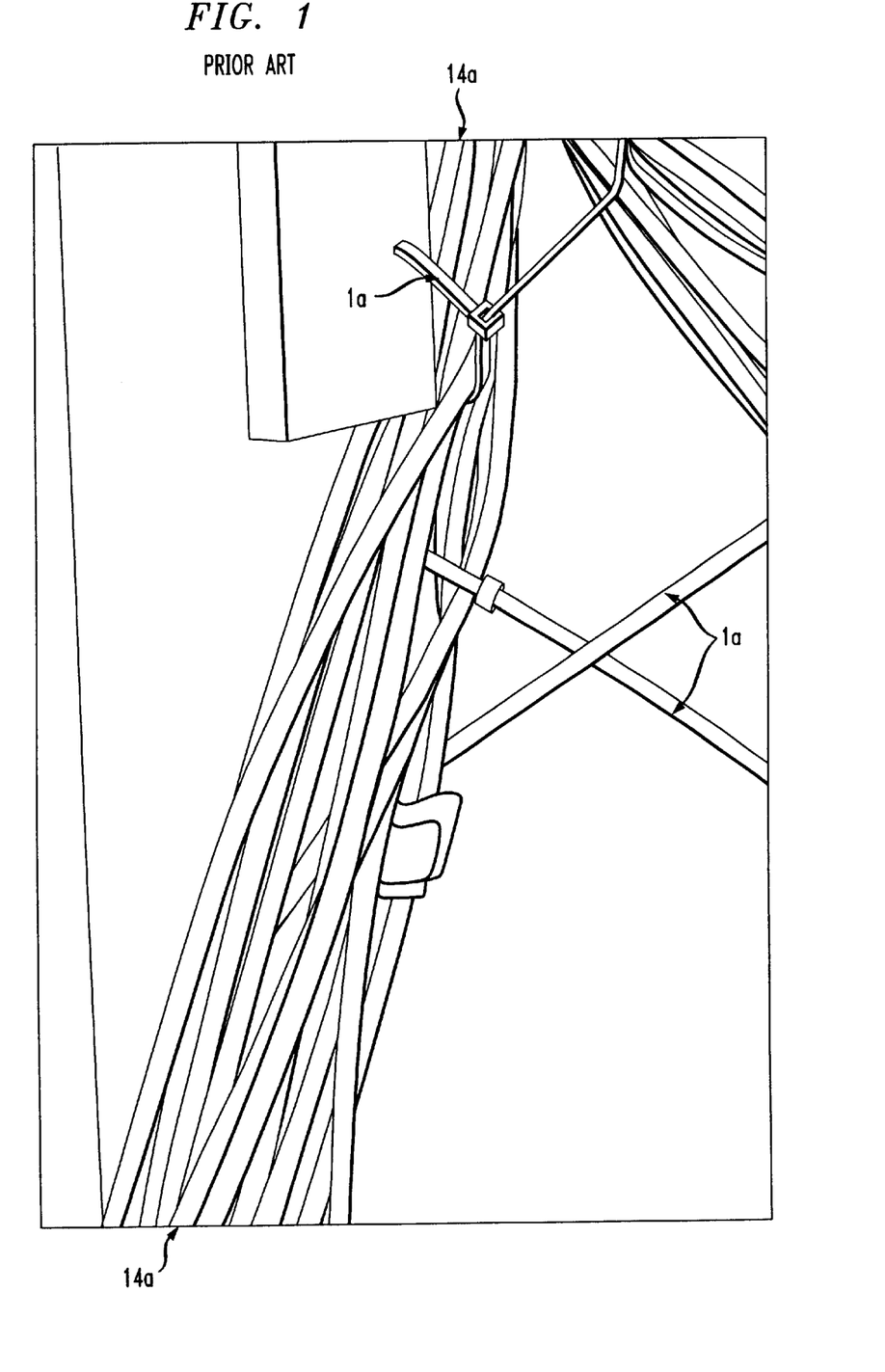
FIG. 1 is a diagram illustrating a prior art method and apparatus for retaining clusters of cables.

Existing back panels, such as those in the "110" connector system, have slots to hold the cables as they are being organized, but the cables tend to fall out of these slots. According to conventional practice in the art, installers attempt to maintain the organization of cable clusters 14a through the use of cable ties 1a, as shown in FIG. 1. However, cable ties take extra time and effort to install.

If cable ties are not used in the existing system, an installer of the cable clusters may have to expend many hours resorting the cables which they already spent perhaps many hours initially sorting. Further, the combination of a typical backboard and cable ties provides little support for the cables. Without the proper support, cables intermingle in a manner which hinders the ability to distinguish between the cable clusters. Consequently, the installer must label each cable cluster using tape or other labelling devices to distinguish one cable cluster from another. In most cases, the installer must remove the cable ties before installing the hardware components.

For the foregoing reasons, there is a need for a cable retention device that reliably retains clusters of cables during installation without the use of cable ties. There is also a need for a retention device that selectively supports the clusters of cables so that the clusters are readily accessible. There is an additional need for a retention device which satisfies these needs and replaces a typical patch panel backboard. There is a further need for a retention device that allows quick and easy installation of component hardware onto a support structure. There is yet another need for a retention device that allows quick and easy installation of other related telecommunication hardware components into the device. Furthermore, there is a need for a retention device which is vertically extendable to accommodate the required number of cable clusters and hardware components.

SUMMARY OF THE INVENTION

The present invention provides a retention device for the installation of cabling, comprising a first or bottom surface for connecting the retention device, to a support structure, an aft surface integrally connected to the bottom surface and projecting away from it and a second or top surface, which is integrally connected to the aft surface and has adjacent gripping members which define passages for gripping the cable clusters. clusters. The gripping members are defined by an edge at the distal side of the passage, a proximal edge at the proximal side of the passage and a structural area connecting them. The passage is defined by the proximal edge of one gripping member, the distal edge of an adjacent gripping member and an aft edge at the junction of the top surface and aft surface. The aft edge engages the second surface in an offset manner sufficiently large to generate clearance for, and reduce bending tension of, the cable clusters which engage the retention device during installation. The gripping member further includes a forward end extension integrally connected to its structural area. This forward end extension has first and second projections which extend distally and proximally of the cable passage, respectively, to partially close it. The gripping member includes a third projection, which extends downwardly toward the bottom surface and is integrally connected to the first and second projections of the forward end extension. The combination of the first, second and third projections extends far enough to create a structure that inhibits the cable clusters from sliding or otherwise selectively exiting the passage between the gripping members.

BRIEF DESCRIPTION OF THE DRAWINGS

These and other features, aspects, and advantages of the invention will become more readily apparent with reference to the following detailed description of a presently preferred, but nonetheless illustrative, embodiment when read in conjunction with the accompanying drawings, in which like reference designations represent like features throughout the enumerated Figures. The drawings referred to herein will be understood as not being drawn to scale, except if specifically noted, the emphasis instead being placed upon illustrating the principles of the invention. In the accompanying drawings.

DETAILED DESCRIPTION OF THE PREFERRED EMBODIMENTS

Reference is now made in detail to an embodiment of the invention that illustrates the best mode presently contemplated by the inventors for practicing the invention. Other embodiments are also described herein.

Figure 2:
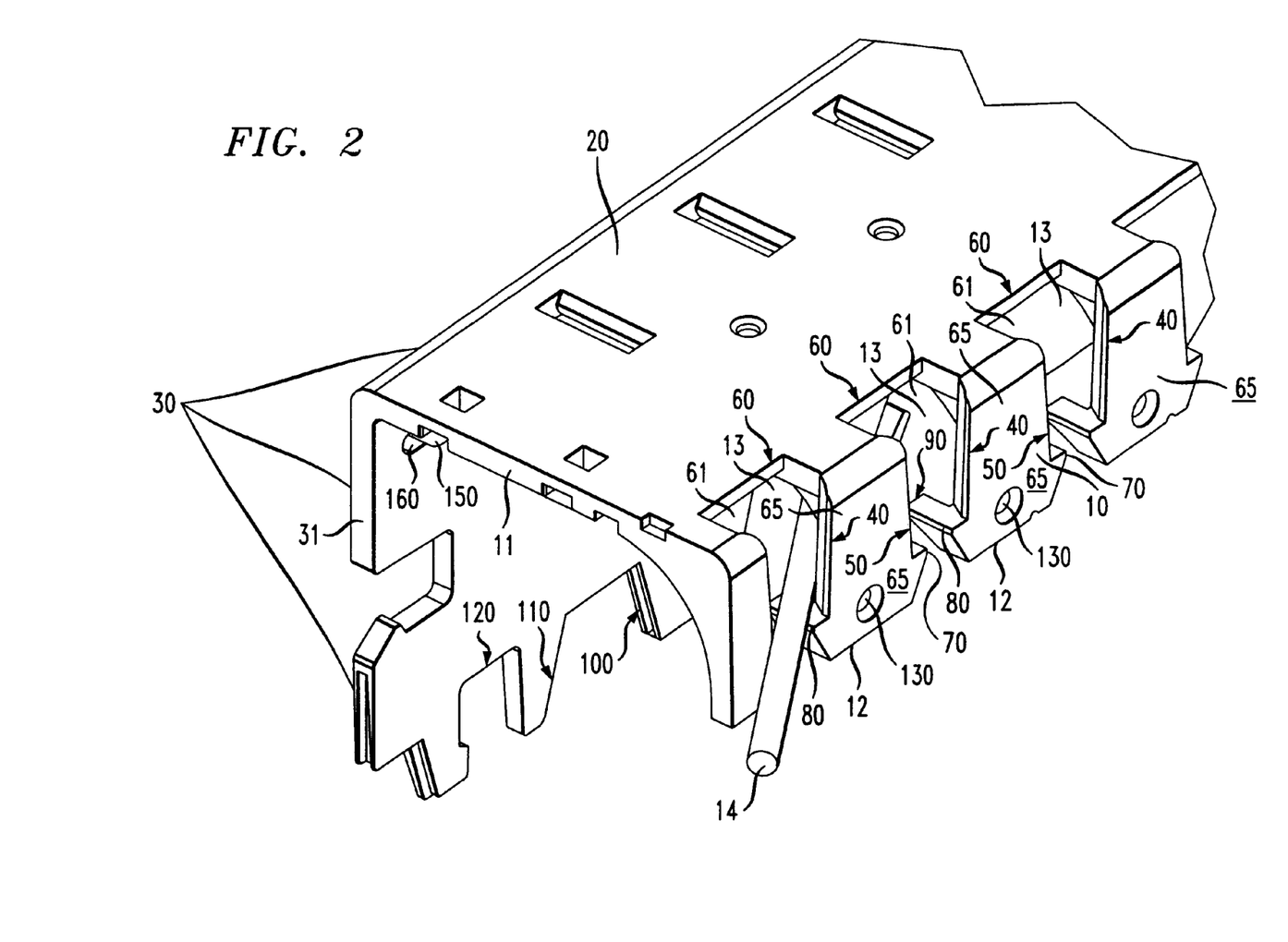
FIG. 2 is a perspective view of a portion of the retention device in accordance with the invention.
Figure 2A:
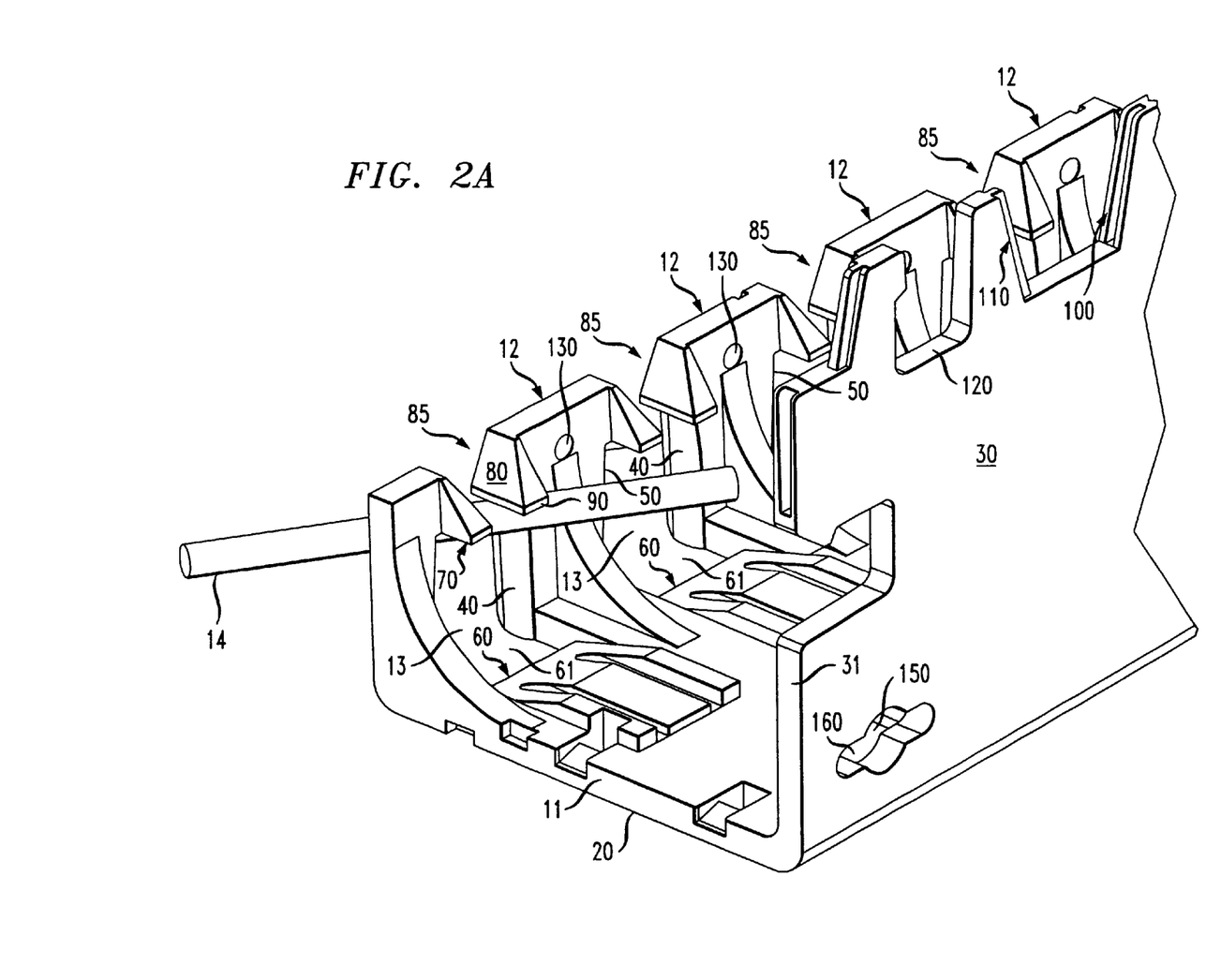
FIG. 2A is another perspective view of a portion of the retention device (as shown in FIG. 1) with a cylindrical rod representing a retained cable or cluster of cables according to the invention.
Figure 3:
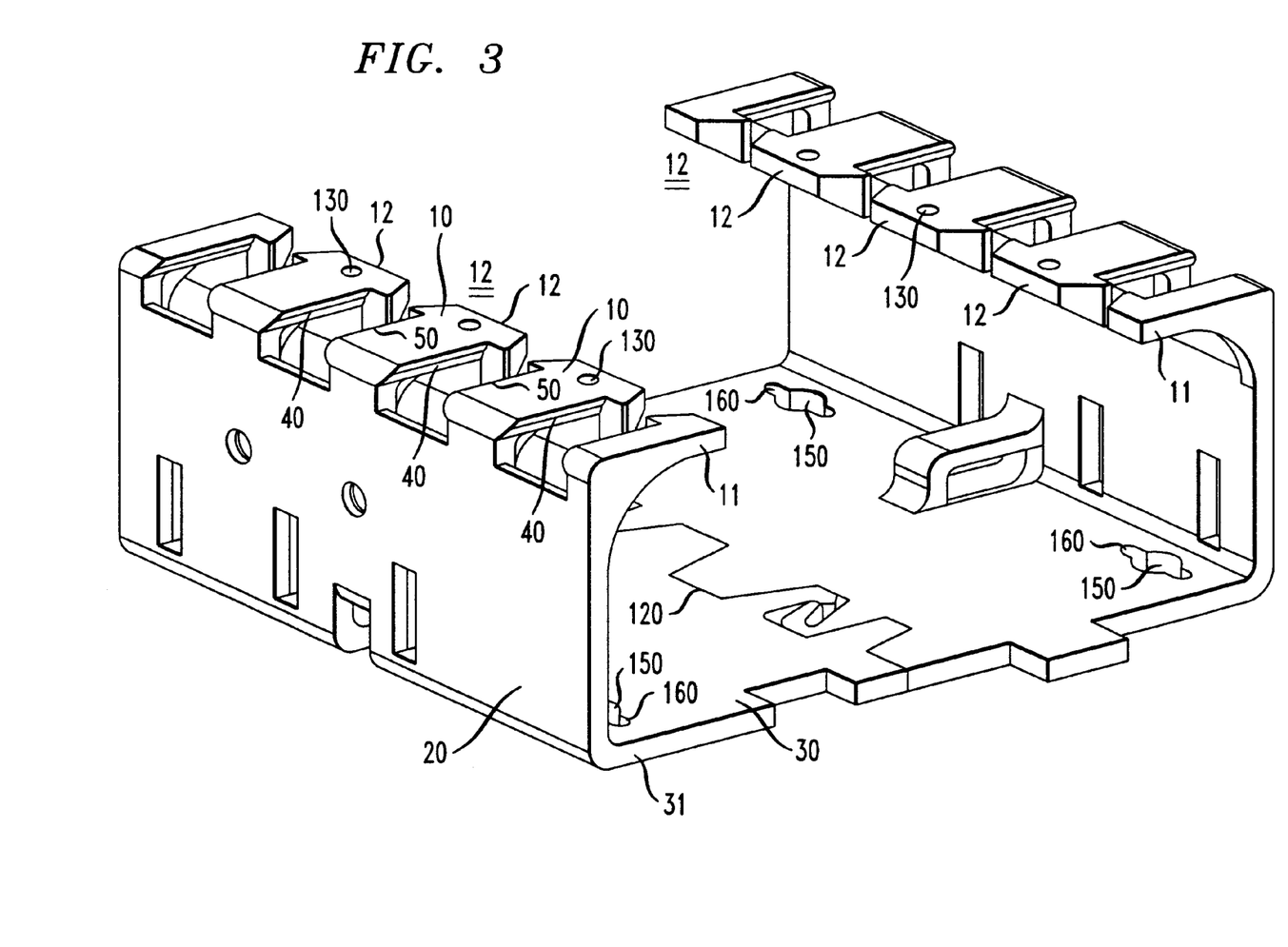
FIG. 3 is a perspective view of a mated pair of retention devices according to the invention.

FIGS. 2 and 2A are diagrams illustrating a retention device according to the invention in two perspective views. Referring now to the several views of the drawings (FIGS. 2 and 2A), there is depicted an integral cable retention device 1 in accordance with the invention. The retention device 1 is made of a material such as steel, plastic or any other material that is sufficiently durable for the application of the retention device 1. The retention device 1 comprises a top surface 10 (as shown in FIG. 3 and to the right in FIG. 2) for retaining a cluster of electrical cables during installation. The retention device 1 also includes a bottom surface 30 (as shown in FIG. 3 and to the left in FIG. 2) for connecting the retention device 1 to a support structure. The retention device 1 further includes an aft (left in FIG. 3) surface 20 that is integrated with and projects away from bottom surface 30 at an angle (e.g. 90°). Aft surface 20 has an aft edge 11 that connects to an aft edge 31 of the bottom surface 30. The aft surface 20 is also integral with, and connected to the top surface 10 at an angle (e.g. 90°) so that the top surface 10 is substantially parallel to the bottom surface 30.

The top surface 10 has at least a first set of grip members 12. Each of the gripping members 12 comprises a distal edge 40, a proximal edge 50 and a structural member 65 between them. The space between the adjacent gripping members 12 forms a passage 13 for receiving a cluster of cables (or wires) 14. "Distal" and "proximal" refer to the direction in and out of the drawing of FIG. 3 with respect to the passage 13 between grip members 12 where the cables are retained. For example, the distal edge 40 of members 12 is on the distal side of the passage 13.

The aft edge 60 engages the aft surface 20 in an offset manner, creating an indentation 61 (FIG. 2). The indentation 61 of the aft edge 60 functions to generate clearance for, and reduce the bending tension of, the cable clusters (e.g., cable cluster 14) which engage the retention device 1. The clearance is great enough to house the cluster of cables 14 after hardware components are attached to the grip members 12. When the top surface 10 comprises a plurality of grip members 12 adjacently displaced on a vertical axis, the structural area 65 serves to vertically separate clusters of cables sufficiently so as to allow cable installers to quickly identify and engage individual clusters of cables.

Each of the distal edges 40 and the proximal edges 50 of the grip members 12 include a forward end extension 85 comprising proximal projection 70, which extends proximally of the passage 13, and distal projection 80, which extends distally of the passage 13 (FIG. 2A). Each extension 85 also includes an aft projection 90 that extends toward the bottom surface and is integrated with the proximal and distal projections. The aft projection 90 is spaced from the aft surface 20 at a distance great enough to allow a cluster of inserted cables (e.g., cable cluster 14) to be retained in passage 13, following the insertion of hardware components.

The bottom face of the forward end extensions 85 between the aft projections 90 is parallel to the top surface. However, the aft faces of the aft projections remain substantially parallel with the aft surface 20. Each of the downward projections 90, the proximal projection 70 and the distal projections 80 of the forward end extensions 85 extends enough to retain the cluster of cables 14. The retention of cable cluster 14 is accomplished by motion resistance. When a user places a cluster of cables 14 aft of the grip members 12 during an installation, the cable cluster 14 cannot forwardly traverse the extensions without engaging substantial motion resistance.

Each retention device has at least a first hardware mounting hole 130 located on at least a first structural area 65, wherein the structural area 65 is located on the top surface 10. Each of the hardware mounting holes 130 is strategically located on the structural area 65, distal of the distal edge 40, and proximal of the proximal edge 50 of each grip member. The location of the holes 130 enables the placement of, for example, a wire block or other hardware component (not shown), which engages the cable cluster following the installation thereof.

The holes 130 used for the hardware components can be used in conjunction with, or replaced with, other structural modifications for connecting various types of hardware components to the retention device 1. Examples of such modifications are clips, snaps or structural voids for mating with the hardware components. Further, an adaptor plate can be used in conjunction with the hardware components, wherein the hardware components engage the adaptor plate and the adaptor plate engages the retention device.

The bottom surface 30 comprises geometric cut outs consisting generally of a series of strategically located peaks and troughs, formed on the proximal edge 100, distal edge 110 and forward edge 120. The cut outs on the proximal edge 100 mirror the cut outs on the distal edge 110. The cut outs on the forward edge 120 are mirrored around an axis that is perpendicular to the vertical axis running through the vertical center of the bottom surface 30. The geometric cut outs are formed on the retention device such that it is attachable to another retention device. The cut outs allow an array of retention devices according to the invention to be installed adjacent to each other while maintaining optimal alignment.

FIG. 3 is a diagram that illustrates a mated pair of retention devices according to the invention. Referring to FIG. 3, one complete set of retention devices comprises two retention devices connected in the following manner. The cut outs on the forward edge 120 of a first retention device face the cut outs on the forward edge 120 of a second retention device. The cut outs on the forward edge 120 of the set of retention devices interlock so that the grip members 12 face toward each other, the proximal edges 50 of opposing grip members being essentially parallel. Other sets of retention devices can be inserted along the vertical axis which runs through the vertical center of the bottom surface 30. The insertion is accomplished where, for example, the cut outs on the proximal edge 100 of the bottom surface 30 of a first set mate with the cut outs on the distal edge 110 of a second set. The resulting formation is a vertical column of sets of retention devices such as the pair shown in FIG. 3, for inserting a plurality of cable clusters during installation.

Figure 4:
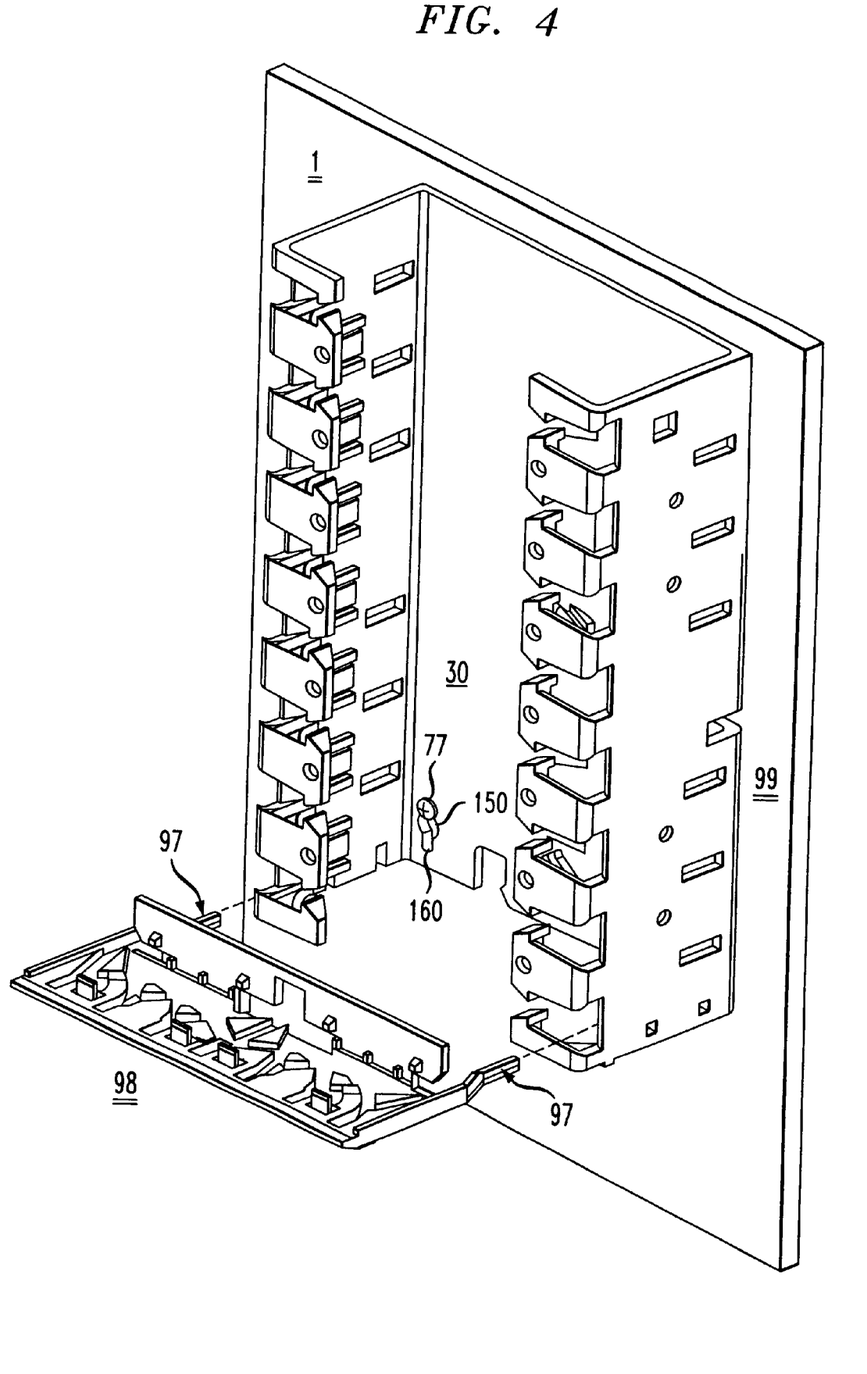
FIG. 4 is a perspective view of a set of retention devices according to the invention being mounted on a support structure and receiving a wiring block.

FIG. 4 is a diagram that illustrates a set of retention devices mounted on a support structure. Referring to FIG. 4, the bottom surface 30 includes at least one through-slot 150 for allowing a screw, bolt or other such fastening device 77 to selectively engage the support structure 99 located behind the retention device 1 for mounting the retention device 1 thereto. The through-slot 150 generally comprises a complex geometry wherein the geometric center of the slot 150 has a diameter essentially at least as large as the head of the fastener 77. The slot 150 further comprises a groove 160 extending both distally and proximally from the center of the slot 150. The radius of the groove 160 is at least as great as the radius of the body of the fastener, but less then the radius of the head of the fastener. The through-slot 150 can be replaced with other structural modifications which accomplish the purpose of engaging the retention device 1 with the support structure 99 in the manner required.

When installing the retention device 1, the fastening device is preferably pre-installed onto the support structure 99. The bottom surface 30 is placed so that the center of the slot 150 fits over the fastening device 77. Then, the retention device 1 slidably engages the support structure 99 so that the body of the fastener 77 engages the groove 160 either distally or proximally. When a plurality of sets of retention devices is mounted on the support structure 99, each set engagingly slides in a similar direction over its fastening device 77. Once the retention device is in place, the device 77 is tightened to hold it in position.

Figure 5:
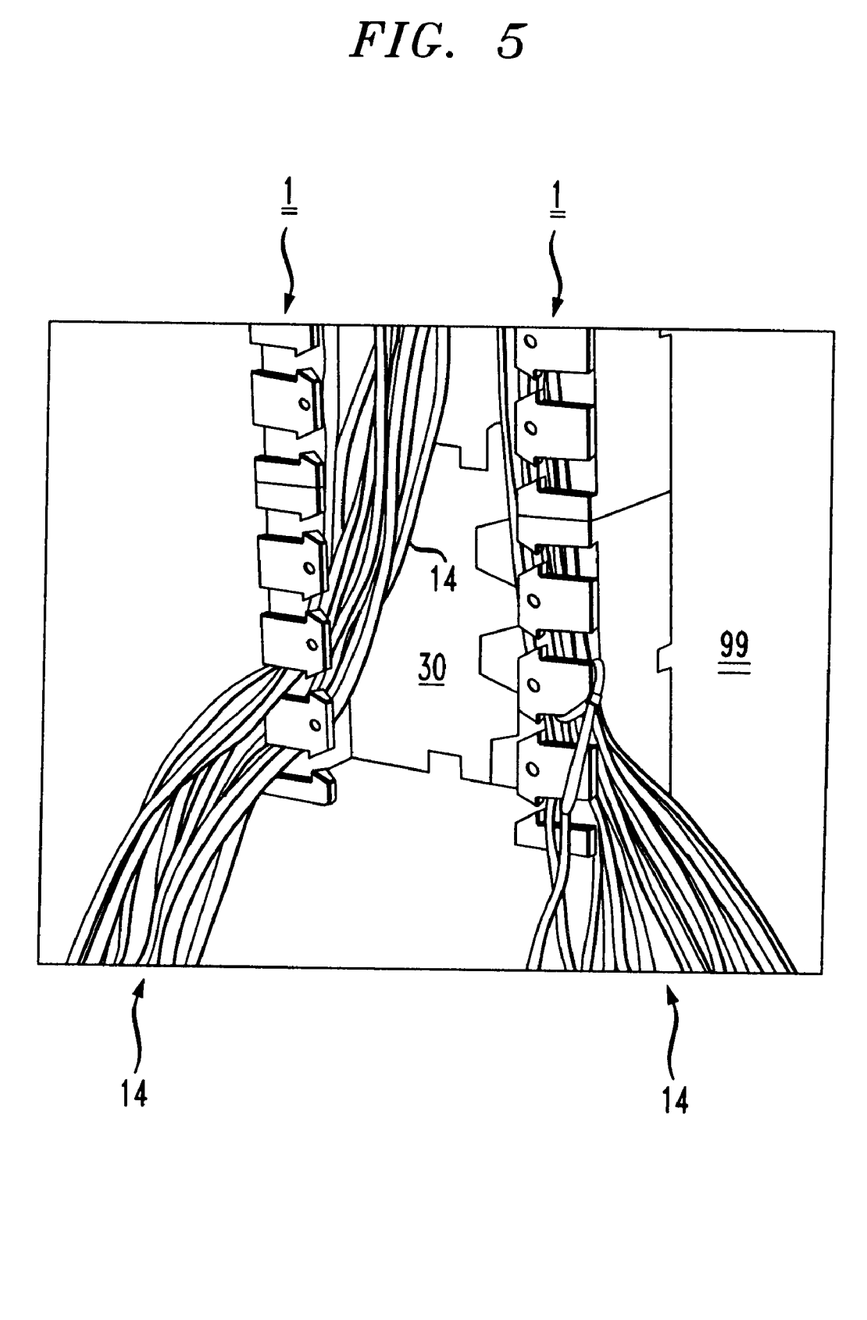
FIG. 5 is a diagram illustrating a set of retention devices of the invention being used to retain clusters of cables.

FIG. 5 is a diagram that illustrates a set of retention devices (1) according to the invention being used to retain clusters of cables (14). Referring to FIG. 5, the retention devices are mounted on the support structure (99), which is a wall. The clusters of cables are placed between the grip members of the retention devices. A hardware component is installed onto the retention devices (1).

The retention device 1 engages a support structure in place of, for example, a "110" Patch Panel System Backboard. Such a backboard normally provides vertical paths for running patch cords or jumpers between "110" Patch Panel System Terminal Blocks. The retention device 1 is designed to be applicable in environments requiring the installation of telecommunication cabling. During cable routing, cables are fed through the retention device 1, wherein specified cable clusters are placed into the gripping members. Depending on the telecommunications system in use, each of the cable clusters comprises, for example, three to seven specified cables for creating a telecommunications circuit.

The retention device 1 is preferably embodied in a form to mate with a three-hundred-pair (300 pair) or nine-hundred-pair (900 pair) Patch Panel Terminal Block, known in the art, such as the wiring block 98 shown in FIG. 4. Such terminal blocks terminate connectorized and raw-ended cable pairs and are available preterminated and connectorized, as known in the art. Starting with the lowest pair of retention devices, wiring block 98 is positioned on the support structure 99 by lining up rails 97 with the groove between the pair of retention devices. Such blocks can comprise "110" wire blocks with connecting blocks and horizontal jumper troughs for arranging patch cords. Such connecting blocks are available in three, four, or five pair sizes to match the pairs per circuit of the telecommunication/cabling system in use.

The retention device 1 also mates with "110" disconnect terminal blocks. The retention device 1 is preferably designed to mate with independent 100 pair or 300 pair "110" wire blocks.

The retention device 1 can also mate with a "110" jumper trough that accommodates patch cords or cross-connect wires. Such troughs can be placed between each 100-pair wiring block and at the vertical top of the component column. The trough serves as a horizontal trough for routing patch cords and cross-connect wiring. The troughs are available with legs and without legs to accommodate "110" A wire blocks or "110D" wire blocks, respectively. Only the "110" wiring blocks and troughs that do not have legs can mount on the retention device, The retention device 1 functions to ease the installation of telecommunication cabling. The need exists for a cable retention device that reliably retains predetermined cable clusters during installation without the use of cable ties. When one or more cables are inserted into the passage of a grip member, the size and shape of the extensions of the grip member keep the cables from falling out. The design of the grip member obviates the need to grip cable clusters with tape or cable ties. Providing that the number of grip members maintained is equal to, or greater then, the number of cable clusters being installed, the cable clusters will not become disorganized following an initial effort to organize the cables.

The need for a retention device that selectively supports the clusters of cables is met since the clusters are readily distinguishable and accessible. The structural areas 65 of the grip members vertically separate each passage 13 so that the clusters of cables are easily distinguishable from each other.

The need for a retention device which meets these needs as well as replaces a typical Patch Panel Backboard is satisfied by the integrated design of the retention device 1. The need for a retention device which allows quick and easy installation of the device into a support structure is satisfied by the through-slot 150, as well as the forward edge cut outs 120. The through-slot 150 allows for easy placement of the retention device on a structural support 99 which is pre-installed with a fastening device such as a screw 77. The forward edge cut outs 120 allow a quick and accurate mating of a second retention device, to make a set of retention devices.

The need for quick and easy installation of related telecommunication hardware components into the retention device is met with the hardware mounting holes 130 and the structural areas 65. The holes 130 are strategically placed to facilitate this process, as they match the mating locations on the hardware components.

The need for a retention device which is vertically extendable to accommodate the required number of cable clusters and hardware components is met by the through-slot 150. Following the placement of a first set of retention devices, at least a second set of retention devices is easily added to the structural support 99. To accomplish this addition, an installer needs to add fasteners in a vertical direction above or below the location of the first set of retention devices.

The need for the vertical extension of retention devices to retain a continuous vertical orientation, is met with the cut outs on the proximal edge 100 and distal edge 110 of the bottom face 30. The proximal edge and the distal edge of one set of the retention devices mate with the proximal edge and the distal edge of another set of retention devices. These cut outs on each complete set of retention devices ensure that the orientation of the additional sets of retention devices will be optimally aligned in a vertical axis, rather then skewed with respect to each other.

Although the invention has been particularly shown and described in detail with reference to the preferred embodiments thereof, the embodiments are not intended to be exhaustive or to limit the invention to the precise forms disclosed herein. It will be understood by those skilled in the art that many modifications in form and detail may be made therein without departing from the spirit and scope of the invention. Similarly, any process steps described herein may be interchangeable with other steps in order to achieve the same result. All such modifications are intended to be encompassed within the scope of the invention, which is defined by the following claims and their equivalents.

We claim:

1. A plurality of sets of retention devices wherein each set is one retention device mated with another retention device, the plurality of sets of retention devices slidably engaging a support structure, each retention device comprising:

a bottom surface adapted for connecting the retention device to a support structure;

an aft surface integrally connected with the bottom surface and projecting away from said bottom surface at an angle;

a top surface integrally connected to said aft surface and being located generally in the plane of said bottom surface, said top surface including at least two adjacent cable gripping members adapted to retain a cable cluster in a passage between them, said passage being defined by an aft edge of said aft surface dimensional such that clearance for the cable cluster is provided, each said gripping member defined by:

the passage having a distal edge and a proximal edge;

said proximal edge being integrally connected to said aft edge and opposing said distal edge; and a structural area connecting said distal and proximal edges.

2. The retention device of claim 1, further comprising a forward end extension, integrally connected to said structural area, said forward end extension includes:

a first projection which extends distally of said passage;

a second projection which extends proximally of said passage; and third projections which are integrally connected with said first and second projections and which extend downwardly toward said bottom surface;

wherein the first, second and third projections extend far enough to create a structure that inhibits the cable cluster from selectively exiting the gripping member.

3. The retention device of claim 1, wherein said top surface further comprises:

at least one extension for each of said gripping members of the at least two gripping members, such said extensions have proximal and distal projections which narrow to an open end of the passage sufficient to retain cables in the passage, but have a clearance sufficient to allow insertion of cables.

4. The retention device of claim 3, wherein said top surface further comprises:

at least one hole adapted for attachment of hardware components selectively located on said vertical extension.

5. The retention device of claim 4, wherein one of said hardware components is a wiring block.

6. The retention device of claim 1 wherein said structural area is wide enough to allow separation between a first pair of cable clusters in a first passage and a second pair of cable clusters in a second passage.

7. The retention device of claim 1, wherein said bottom surface further comprises mirroring geometric cut outs of peaks and troughs.

8. The retention device of claim 1, wherein said bottom surface further comprises:

cut outs of peaks and troughs formed on a forward edge of said bottom surface, wherein said cut outs are mirrored around an axis that is perpendicular to a vertical axis, running through a vertical center of said bottom surface.

9. The retention device of claim 1, further comprising:

geometric cut outs formed on said bottom surface, such that the retention device is attachable to another retention device according to claim 1.

10. The retention device of claim 1, wherein said bottom surface further comprises:

at least one through-slot, selectively located on said bottom surface and adapted for selectively engaging member projections from a support structure for retaining the retention device on said support structure.

11. The retention device of claim 10, further comprising a fastening device consisting of a screw and bolt, wherein diameter of said through-slot is at least as large as a head of said fastening device.

12. The retention device of claim 11, wherein a radius of a groove is at least as great as a radius of body of said fastening device and less than a radius of a head of said fastening device.

13. The retention device of claim 10, said through-slot further comprising a groove that extends distally and proximally from center of said through-slot.

14. The retention device of claim 1, wherein a fastening device, consisting of a screw and bolt, selectively connects said retention device to said support structure.

15. The retention device of claim 1, wherein said top surface further comprises:

at least one structural modification, consisting of at least one of a clip, a snap, a structural void, and a hole, connecting hardware components to the retention device.

16. A plurality of sets of retention devices wherein each set is one retention device of claim 1 mated with another retention device according to claim 1, the plurality of sets of retention devices being vertically positioned to accommodate installation of cable clusters.

17. The sets of retention devices of claim 1 wherein each set comprises a bottom face having an upper edge and a lower edge, said upper edge and said lower edge of one set mate with upper edge and lower edge of adjacent sets.

* * * * *